(12) United States Patent
Cheng et al.

(10) Patent No.: US 12,373,197 B2
(45) Date of Patent: Jul. 29, 2025

(54) SYSTEMS AND METHODS FOR PROVIDING INTERACTIVE SOFTWARE-DEVELOPMENT LINKS VIA USER INTERFACES

(71) Applicant: Capital One Services, LLC, McLean, VA (US)

(72) Inventors: Roger Cheng, McLean, VA (US); Seth Thomas, McLean, VA (US); Gary Shaver, McLean, VA (US); Paul Staggs, McLean, VA (US); Ally Yuan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 105 days.

(21) Appl. No.: 18/353,872

(22) Filed: Jul. 17, 2023

(65) Prior Publication Data
US 2025/0028524 A1  Jan. 23, 2025

(51) Int. Cl.
*G06F 8/71* (2018.01)
*G06F 8/36* (2018.01)

(52) U.S. Cl.
CPC . *G06F 8/71* (2013.01); *G06F 8/36* (2013.01)

(58) Field of Classification Search
None
See application file for complete search history.

(56) References Cited

U.S. PATENT DOCUMENTS

| 8,819,617 B1* | 8/2014 | Koenig | G06F 8/70 717/102 |
| 2003/0140291 A1* | 7/2003 | Brown | G06F 11/2294 714/724 |
| 2025/0028524 A1* | 1/2025 | Cheng | G06F 8/36 |

OTHER PUBLICATIONS

Tammana, "Distributed Network Monitoring and Debugging with SwitchPointer", 2018, USENIX (Year: 2018).*

* cited by examiner

*Primary Examiner* — Hossain M Morshed
(74) *Attorney, Agent, or Firm* — Foley & Lardner LLP

(57) ABSTRACT

Providing interactive software-development links via user interfaces, based on remotely retrieved information from remote computer networks without requiring users to transition between websites within the user interfaces may be facilitated. In some embodiments, an Application Programming Interface (API) may be provided that is configured to receive one or more commands from a first server and a second server. The system may receive via a monitoring-function installed on a client device, a first message from the first server to update a source code file stored in a software-version controlled repository. The system may determine from the first message, a source code file identifier. The system may then receive, via the monitoring-function, a second message from the second server indicating an update associated with a software-development automation service platform. The system may determine, from the second message, a feature update characteristic and may display a message comprising the source code file identifier and the feature update characteristic.

20 Claims, 5 Drawing Sheets

SYSTEMS AND METHODS FOR PROVIDING INTERACTIVE SOFTWARE-DEVELOPMENT LINKS VIA USER INTERFACES

BACKGROUND

As software applications continue to increase in complexity, so do the errors associated with developing such software applications. Software developers can face many hurdles chasing down the cause of an error and how to resolve the error due to the complex nature of these software applications involving multiple code libraries and multiple functions/methods relying on the output of another function/method. When an error occurs, the software developer may look at a log file to take a guess at which line of code, or which file is causing the error. However, due to the rudimentary view of such log files, software developers often go down a rabbit hole chasing after an error or attempting to find a resolution to an error that may not actually resolve the underlying error at hand.

SUMMARY

Methods and systems are described herein for novel uses and/or improvements to software-development user interfaces. As one example, methods and systems are described herein for providing interactive software-development links via user interfaces, based on remotely retrieved information from remote computer networks without requiring users to transition between websites in the user interfaces.

Existing systems rely on rudimentary log files and other software-development tools for providing error-related information when developing software applications. For example, existing software-development tools may focus on a single aspect of software development (e.g., source code compilation errors, build statuses, etc.) requiring software developers to use each tool individually to correct a given error or resolve a given problem. This can result in software developers missing potential errors as, due to the complexity of recent software applications, multiple code libraries, files, and other resources are involved with a single software application, and each software-development tool may only be configured for a single library or aspect of software development. Moreover, such development tools are not integrated with one another, resulting in one tool giving one error, and another tool giving a different error, further confusing the software developer about which error to resolve first, which error is causing other errors, and where to begin with resolving such errors. As such, although the development tools may be designed to enhance the software developer's experience, such tools may impede timely software development as software developers are faced with the problem of context switching when viewing results from these software-development tools. For example, context switching is the process of switching from one task to another task, which can cause the software developer to forget important information in attempting to resolve one error when the error may truly reside in another domain that requires the software developer's attention. Due to the nature of context switching, the software developer may attempt to resolve one error and accidentally cause another error associated with a different aspect of the software application.

As difficulties encountered by software developers stemming from context switching are ever so prevalent when software developers utilize a plethora of unintegrated software-development tools, as discussed above, the software developer may miss an error or chase an error that is unrelated to the true underlying cause of the error. Existing software-development tools currently execute in an isolated environment without knowledge or data being received between the other software-development tools, further confusing the software developer when attempting to resolve an error. Additionally, existing software-development tools lack any feature to integrate multiple tools together, which further propels the issues described above.

To overcome these technical deficiencies, methods and systems disclosed herein provide a software-module application via a software application that includes a monitoring-function to monitor requests from differing servers through an Application Programming Interface (API). For example, by providing a software-module application that includes a monitoring-function, the monitoring-function may monitor transmitted data from disparate web servers that provide software-development frameworks to enable software developers to be provided with an inclusive, integrated, and interactive user interface without requiring the software developers to transition between websites within user interfaces provided by the software-development frameworks. Accordingly, the methods and systems provide a unique, integrated, interactive, and improved user interface that reduces the issues commonly associated with context switching.

For example, the software-module application installed on a client device via a software application may receive messages from disparate servers (e.g., software-development frameworks). The messages may include updates to source code files, updates associated with software-development automation service platforms, or other software-development frameworks. By doing so, the system may aggregate updates associated with software application development that would otherwise only be accessible by transitioning between the various websites providing such updates. Using the received messages, the system may determine source code file identifiers and feature update characteristics associated with the software-development frameworks to generate for display, a message that includes the source code file identifiers and the feature update characteristics. Such a message that includes the source code file identifiers and feature update characteristics may include an interactive link to an address associated with the source code file. For example, the interactive link to the address associated with the source code file may enable the software developer to view additional information associated with the source code file update, such as a line of code that was updated, an error associated with a line of code, or historical resolution information indicating past resolutions to the error. Accordingly, the software developer may be provided with an interactive user interface in one place without being required to context switch, by transitioning away from the current user interface and viewing the software-development framework updates via their respective, disparate, user interfaces.

In some aspects, the system may provide an API that is accessible by a first server and a second server that is configured to receive one or more commands from the first server and the second server, where the API allows a software application installed on a client device to exchange data with the first server and the second server in a synchronous request-response pattern. The system may then provide a software-module application installed on the client device via the software application that comprises a monitoring-function to monitor requests from the first server and the second server, where the monitoring-function exchanges data via the synchronous request-response pattern. The system may then receive, via the monitoring-function, a first message from the first server, wherein the first message indicates an update to a source code file stored in a software-version controlled repository. A source code file identifier identifying the source code file may then be determined from the first message. The system may then receive, via the monitoring-function, a second message from the second server, where the second message indicates an update associated with a software-development automation service platform. A feature update characteristic may be determined from the second message, where the feature update characteristic indicates a characteristic associated with the update. The system may then generate, for display, from the software-module application, a message comprising the source code file identifier and the feature update characteristic, where the source code file identifier includes a link to an address associated with the source code file.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
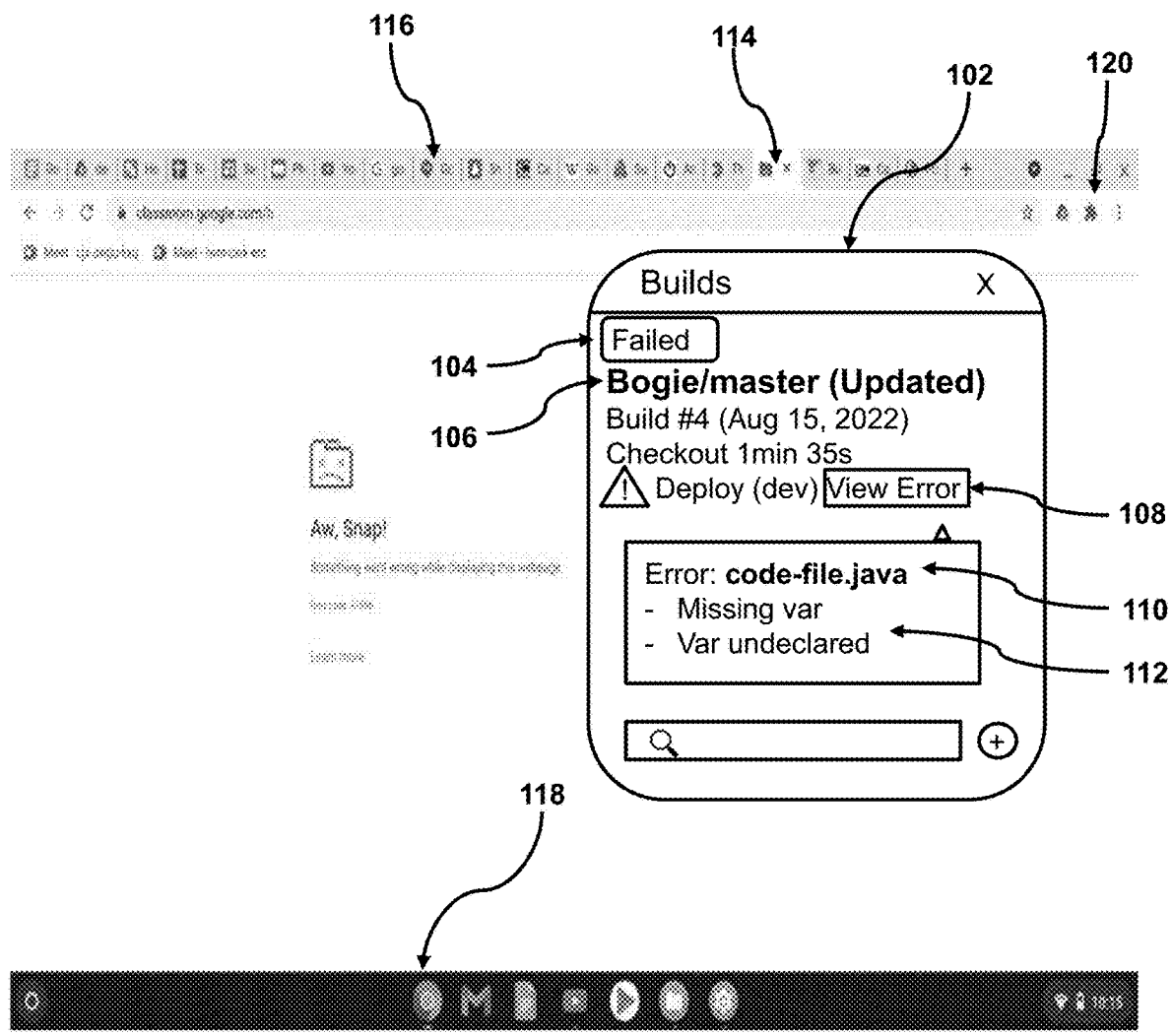
FIG. 1 shows an illustrative diagram for providing interactive software-development links via user interfaces, based on remotely retrieved information from remote computer networks without requiring users to transition between websites in the user interfaces, in accordance with one or more embodiments.

FIG. 1 shows an illustrative diagram for providing interactive software-development links via user interfaces, based on remotely retrieved information from remote computer networks without requiring users to transition between websites in the user interfaces, in accordance with one or more embodiments. For example, interactive user interface 100 may indicate an illustrative view of an interactive user interface 102 providing interactive software-development links without requiring users to transition between websites within user interfaces. For example, FIG. 1 illustrates an illustrative view of a user viewing multiple websites via multiple user interfaces, where interactive user interface 102 is provided to enable users to view interactive software-development links without the need to transition between websites within respective user interfaces. For instance, a software developer may be developing a software application. During software development, the software developer may use a variety of software-development tools that are associated with web-based user interfaces. For example, first web-based user interface 114 may be related to a software-version controlled repository storing source code files and second web-based user interface 116 may be related to a software-development pipeline. Existing systems currently have no mechanism for integrating data between disparate software-development platforms (e.g., first web-based user interface 114 and second web-based user interface 116) which cause a software developer to transition between the two software-development platforms. During such transition, the software developer is forced to "context switch," which, when attempting to resolve an error related to developing the software application, may cause the software developer to focus on a differing error or other aspect of software development that is not in accordance with the originally presented error. As such, the software developer may lose valuable time and waste an abundance of valuable computer processing resources as the software developer may attempt to resolve an unrelated error as opposed to focusing on the underlying error at hand. Moreover, network traffic may be increased as the software developer may perform arduous research attempting to resolve an error which may be unrelated to the underlying error at hand.

To resolve such problems, interactive user interface 102 may be generated and may include status identifier 104, aspect identifier 106, user-selectable object 108, interactive link 110, details information 112, or other information. In some embodiments, interactive user interface 102 may integrate data between the disparate software-development platforms that are accessed via a web-based user interface (e.g., first web-based user interface 114 and second web-based user interface 116) to enable the software developer to be provided with interactive software-development links without requiring the user to transition between the disparate software-development platforms. As an example, the interactive user interface 102 may be part of a software-module application installed on a client device via a software application that comprises a monitoring-function. For example, the software application 118 may be a web browser and the software-module application 120 may be a web browser plug-in. The software application 118 may provide an API that is accessible by a first and second server that is configured to receive one or more commands from the first and second server. For instance, the first and second server may be associated, respectively, with a first disparate software-development platform and a second disparate software-development platform. Such disparate software-development platforms may also be associated with respective user interfaces, (e.g., first web-based user interface 114 and second web-based user interface 116). The API may enable the software application 118 installed on a client device to exchange data (e.g., software-development updates, software-development statuses, or other software-development-related information) with the first and second servers in a synchronous request-response pattern.

To integrate the data from each of the disparate software-development platforms obtained via the servers associated with the respective software-development platforms, the software-module application 120 may include a monitoring-function to monitor requests from the first and second servers in the synchronous request-response pattern. As such, the system may integrate data between the disparate software-development platforms to generate one or more interactive software-development links. For instance, the system may receive, via the monitoring-function, a first message from the first server and a second message from the second server, where the first message indicates an update to a source code file and a file identifier of the updated source code file, and where the second message indicates an update associated with a software-development automation service platform and a feature update characteristic associated with the update. The system may then generate for display, via the software-module application, a message that includes the source code file identifier (e.g., interactive link 110) and the feature update characteristic (e.g., aspect identifier 106), where the source code file identifier includes a link to an address associated with the source code file. As such, the system may provide interactive software-development links via user interfaces, based on remotely retrieved information from remote computer networks without requiring users to transition between websites in the user interfaces, thereby improving the user experience via an improved user interface.

The system may be used to reduce negative effects from context switching by providing interactive software-development links via a user interface based on remotely retrieved information from remote computer networks without requiring users to transition between websites in user interfaces. In disclosed embodiments, a user interface may comprise a human-computer interaction and communication in a device, and may include display screens, keyboards, a mouse, and the appearance of a desktop. For example, a user interface may comprise a way a user interacts with an application of a website. In some embodiments, a user interface may be associated with a website. For example, a website may provide a user interface to enable a user to interact with the website. The user interface may be part of the front end of a computing system that is connected to a back end of the computing system (e.g., servers, databases, or other backend computing components). In some embodiments, the user interface may be configured to present content to a user.

In disclosed embodiments content should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user. Content may also refer to messages, text, images, status updates, or other content associated with one or more aspects of software development. For example, content associated with one or more aspects of software development may include updates to source code files, a status of a given software application, workflow pipeline information associated with a software application development, indications of errors, interactive links of errors (e.g., hyperlinks to sources of errors, hyperlinks to resolutions to errors), or other software-development-related content, in accordance with one or more embodiments.

The system may be used to integrate information from remotely retrieved information from remote computer networks. In disclosed embodiments, a remote computer network may be any computing system that is remote from another computing system. In some embodiments, a remote computing network may be a server that is communicatively connected to a database that is remote from a main computing system. For example, the main computing system may be a system that integrates remotely retrieved information from one or more remote computer networks, where the one or more remote computer networks are not part of the main computing system (e.g., the remote computer networks are accessible over an API, the Internet, or one or more other computing networks). In some embodiments, the remote computer network may be a computer network that is not physically accessible by a user. For example, a remote computer network may be a computer network that is located in a different location than that of the computing system of the user.

The system may use APIs to enable a software application installed on a client device to exchange data with one or more servers. In disclosed embodiments, the API may comprise a way for two or more computer programs to communicate with each other. In some embodiments, the API may comprise an interface that services other pieces of software. For example, an API may connect two software applications together to enable the software applications to interact with one another based on a set of definitions or protocols. In some embodiments, the API may comprise a web API that enables communication between computers that are connected via the Internet. In some embodiments, the API may comprise a remote API. In some embodiments, the API may be a synchronous API, which may be installed on a client device (e.g., a user device, or a mobile device) to enable a software application to exchange data with one or more servers in a synchronous request-response pattern, which allows a call site to be blocked while waiting for the request-related code to finish executing prior to receiving a response. In some embodiments, the API may be an asynchronous API, which may be installed on a client device to enable a software application to exchange data with one or more servers in an asynchronous request-response pattern, which allows a call site to remain open (e.g., not blocked) while waiting for the request-related code to finish executing, thereby enabling a response to be received by the API prior to the request-related code finishing execution.

Figure 2:
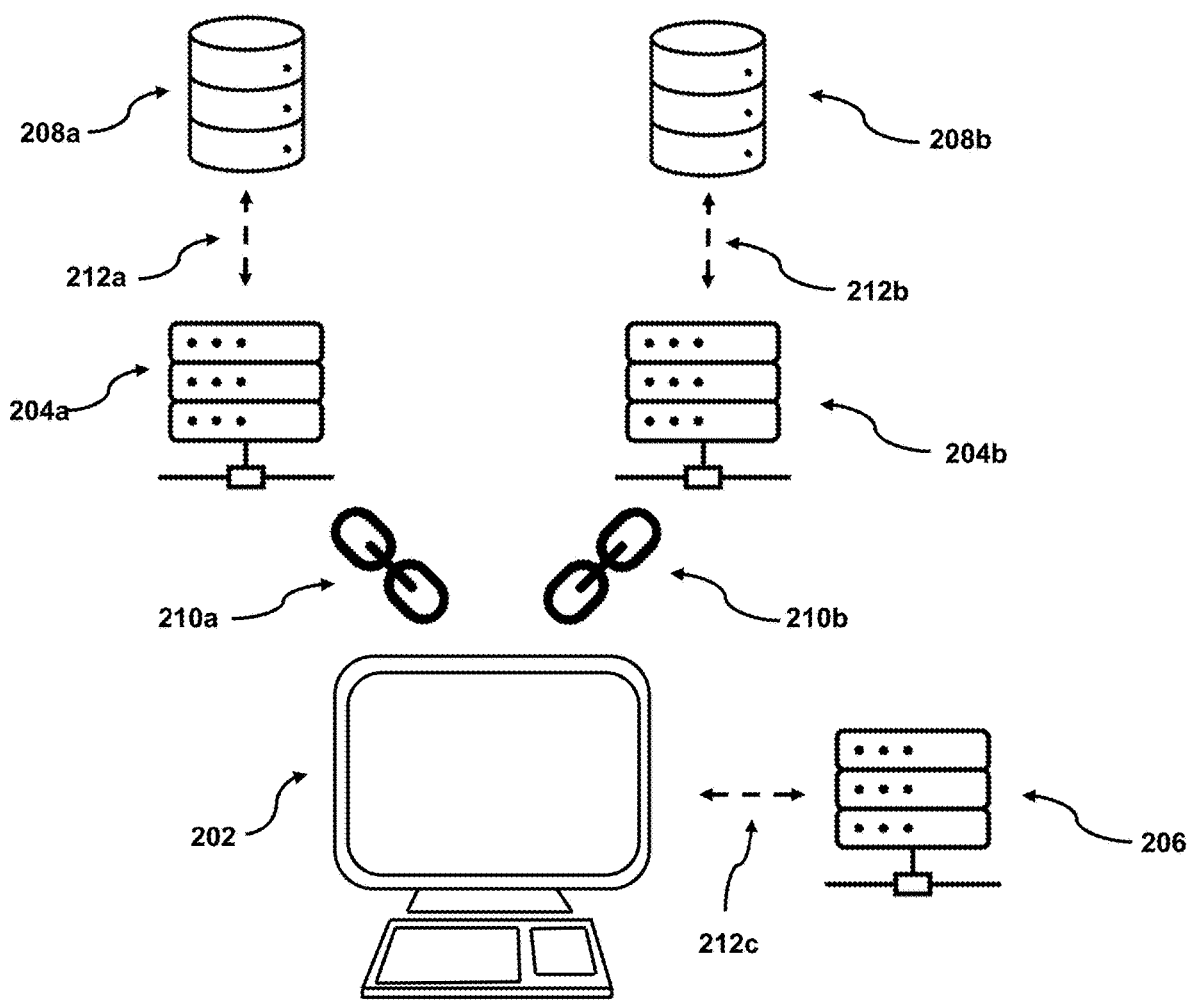
FIG. 2 shows an illustrative diagram for retrieving remotely retrieved information from disparate remote computer networks, in accordance with one or more embodiments.

FIG. 2 shows an illustrative diagram for retrieving remotely retrieved information from disparate remote computer networks, in accordance with one or more embodiments. For example, FIG. 2 shows a client device 202 retrieving information from a first server 204*a* and a second server 204*b* via first monitoring-function 210*a* and second monitoring-function 210*b*. In some embodiments, first server 204*a* and second server 204*b* may be remote from client device 202, and each of first server 204*a* and second server 204*b* may be associated with a respective computing network that are remote from one another. First monitoring-function 210*a* and second monitoring-function 210*b* may be part of a software-module application installed on client device 202 hosting a software application. For example, the software application hosted (e.g., installed, executed, stored) on client device 202 may be a software application that fetches content from the World Wide Web or from local storage and displays such content on client device 202. As an example, the software application may be a web browsing application installed on client device 202. The software-module application may be a sub-application or a module-based application that may manage, control, or process information that the software application cannot manage, control, or process. For example, the software-module application may be configured for processing information that the software application cannot natively process. For instance, the software-module application may be a web browser plug-in.

In some embodiments, the software-module application may include one or more monitoring-functions. For example, the monitoring-function may monitor messages, requests, responses, calls, or other information that flows between the client device 202 (or the software-module application or the software application) and the first server 204*a* and the second server 204*b*. For instance, the monitoring-function may be a webhook and the first server 204*a* and the second server 204*b* may each be associated with an API. For example, a webhook may be an HTTP-based callback function that enables communication between APIs. In some embodiments, webhooks receive information to and from the APIs to which they are connected and may be used to trigger various automations, processes, functions, or other events.

As shown in FIG. 2, first server 204*a* and second server 204*b* may each be associated with a database, such as first database 208*a* and second database 208*b*, respectively. First database 208*a* and second database 208*b* may each store information that is accessible by the first server 204*a* and second server 204*b* via first communication link 212*a* and second communication link 212*b*, respectively. As an example, communication links 212*a*, and 212*b* may be a communication pathway to enable an exchange of data between one or more components of FIG. 2, such as a wired or wireless network connection. In some embodiments, client device 202 may communicate with a third server 206 via communication link 212*c*. For example, third server 206 may be associated with a computing network and/or client device 202. For instance, third server 206 may communicate with client device 202 and may provide one or more instructions or other information to client device 202 (e.g., regarding the generation of one or more interactive user interfaces, messages, or other system functions, in accordance with one or more embodiments).

In one use case, to provide interactive software-development links via user interfaces based on remotely retrieved information from remote computer networks without requiring users to transition between websites in user interfaces, a software-module application including a monitoring-function may be installed on client device 202 via a software application additionally installed on client device 202. For example, where first server 204*a* is associated with a software-related development platform, such as a software-version controlled repository, and where second server 204*b* is associated with another software-related development platform such as a software-development automation service platform, the software-module application may provide monitoring-functions 210 to monitor requests from the software-version controlled repository and the software-development automation service platform. The software-version controlled repository may be a repository for storing one or more source code files related to a software application that indicates different versions of a source code file. For example, each source code file stored in the software-version controlled repository may indicate a versioning identifier (e.g., a numerical value, alphanumerical value, string, text, or other value to indicate a version of a given source code file). The software-development automation service platform may be a Continuous Integration/Continuous Deployment (CI/CD) platform that indicates a pipeline of tasks, builds, and other related steps associated with building, testing, and deploying code (e.g., software applications). The software-version controlled repository and software-development automation service platform may not be integrated with one another. Due to such disintegration, when developing a software application with such tools (e.g., the software-version controlled repository and the software-development automation service platform), the user may have to visit each tool's website and user interface, respectively, to obtain information from each.

For instance, one tool may provide source code files (e.g., store source code files), updates to the source code files (e.g., an indication that a code file has been updated, a date/time a code file has been updated, a line of code that has been updated from a code file, or other update-related information), or other source code file-related information, and another tool may provide various software-development pipeline features, such as indicating a stage of a build (e.g., current stage of a software application), a timeline of a software application and the stages involved in developing a software application, successes or failures of a build, or other workflow or software-development pipeline features. When a user is developing a software application, one action the user does may affect an outcome associated with the software application. For example, a developer may edit a source code file of the software application. Where the edited source code file contains an error, that error may not only appear to the software developer when compiling the code, but may also affect the timeline which the software application may be associated with. For example, when the user is attempting to monitor which stage of development the software application is currently in, the error in the source code file may impact the current stage of development. As existing systems currently have no mechanism to integrate one tool (e.g., the software-version controlled library) with another tool (e.g., the software-development automation service platform), the disclosed monitoring-function may integrate information retrieved from such remote tools to enable users to forgo transitioning between the user interfaces associated with each respective remote tool, thereby reducing the negative impacts of context switching. Moreover, by using a monitoring-function to integrate/retrieve information from the remote tools/computing networks, the amount of network traffic may be reduced as the user (e.g., software developer) need not continually refresh the websites associated with each tool/remote computing network to obtain software-development-related information associated with each remote tool/computing network.

Figure 3:
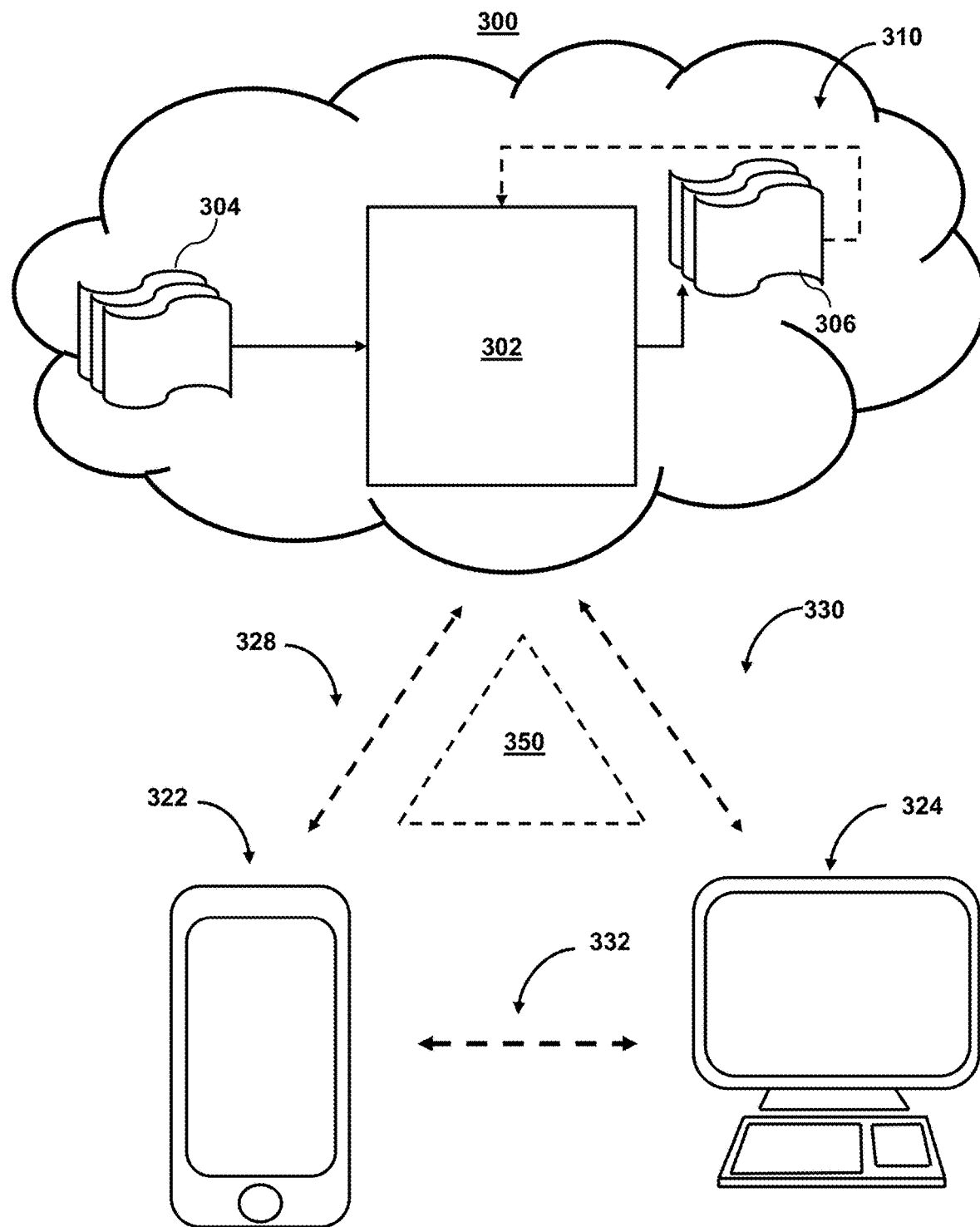
FIG. 3 shows illustrative components for a system used to integrate remotely retrieved information from disparate remote computer networks, in accordance with one or more embodiments.

FIG. 3 shows illustrative components for a system used to integrate remotely retrieved information from disparate remote computer networks, in accordance with one or more embodiments. For example, FIG. 3 may show illustrative components for providing interactive software-development links via user interfaces, based on remotely retrieved information from remote computer networks without requiring users to transition between websites in the user interfaces. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., feature update characteristics, errors, resolutions to errors, messages and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more components of FIG. 2. In some embodiments, cloud components 310 may represent a remote computing network (e.g., remote from mobile device 322 or user terminal 324). For example, cloud component 310 may include first server 204a and first database 208a or second server 204b and second database 208b such that mobile device 322 or user terminal 324 may interact with such remote computing networks/systems. In some embodiments, communication paths 328, 330, and 332 may correspond to one or more of monitoring-functions 210 of FIG. 2 to monitor information passed between respective components of FIG. 3 (e.g., cloud components 310, mobile device 322, and user terminal 324). It should be noted, that, in some embodiments, cloud components 310, mobile device 322, and user terminal 324 can correspond to client device 202 (FIG. 2) to communicate with one or more remote computing networks/systems, in accordance with one or more embodiments.

Cloud components 310 may access one or more remote databases. For example, cloud components 310 may access various databases, such as a training data database, system data database, software-development platform databases, or other databases. For instance, a training data database may be a database configured to store training data for one or more machine learning models, in accordance with one or more embodiments. Training data may include labeled training data associated with resolutions to errors, such as source code files, source code file identifiers, errors, indicators of errors, feature update characteristics indicating an error, resolutions to errors, text associated with resolutions to errors, or other information. System data database may be a database configured to store system information. For example, the system information may include content associated with software development, such as messages, graphical components, images, videos, multimedia, historically resolved errors, feature update characteristics, historical errors, addresses associated with remote computing networks, addresses associated with directories within remote computing networks, identifiers, or other system information. Software-development platform databases may be a database that is associated with a given software-development platform. For example, for each software-development platform (or remote computing network) system 300 interacts with, each remote computing network may include its own database. For instance, each respective database of a given software-development platform may be accessible via one or more APIs associated with the given software-development platform to enable system 300 to obtain information from it. In one use case, where a given software-development platform is a software-version controlled repository, the software-version controlled repository may include a database that stores one or more source code files. As another use case, where a given software-development platform is a software-development automation service platform, the software-development automation service platform may include a database that stores one or more feature update characteristics for a given software-development pipeline service.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. For example, the inputs may include feature update characteristics, indications of updates to source code files, and/or resolutions to errors. The outputs may include resolutions to errors, location information of where the resolutions to the errors are located (e.g., in a database, in a memory, on a server, etc.), or other error-related information. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., errors, resolutions to errors, or other error-related information).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation, and inhibition for model 302 may be more free-flowing with connections interacting in a more chaotic and complex fashion. During testing, an output layer of model 302 may indicate whether or not a given input corresponds to a classification of model 302 (e.g., errors, resolution to errors, or other error-related information).

In some embodiments, the model (e.g., model 302) may automatically perform actions based on outputs 306. In some embodiments, the model (e.g., model 302) may not perform any actions. The output of the model (e.g., model 302) may be used to generate messages, generate interactive links (e.g., addresses to an error, addresses to a resolution of an error), generate visual indicators (e.g., status indicators), generate error details (e.g., information related to an error), generate status details (e.g., information related to a status of a process, build, stage, or other status-related details), or generate other actions, in accordance with one or more embodiments.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front end and back end. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
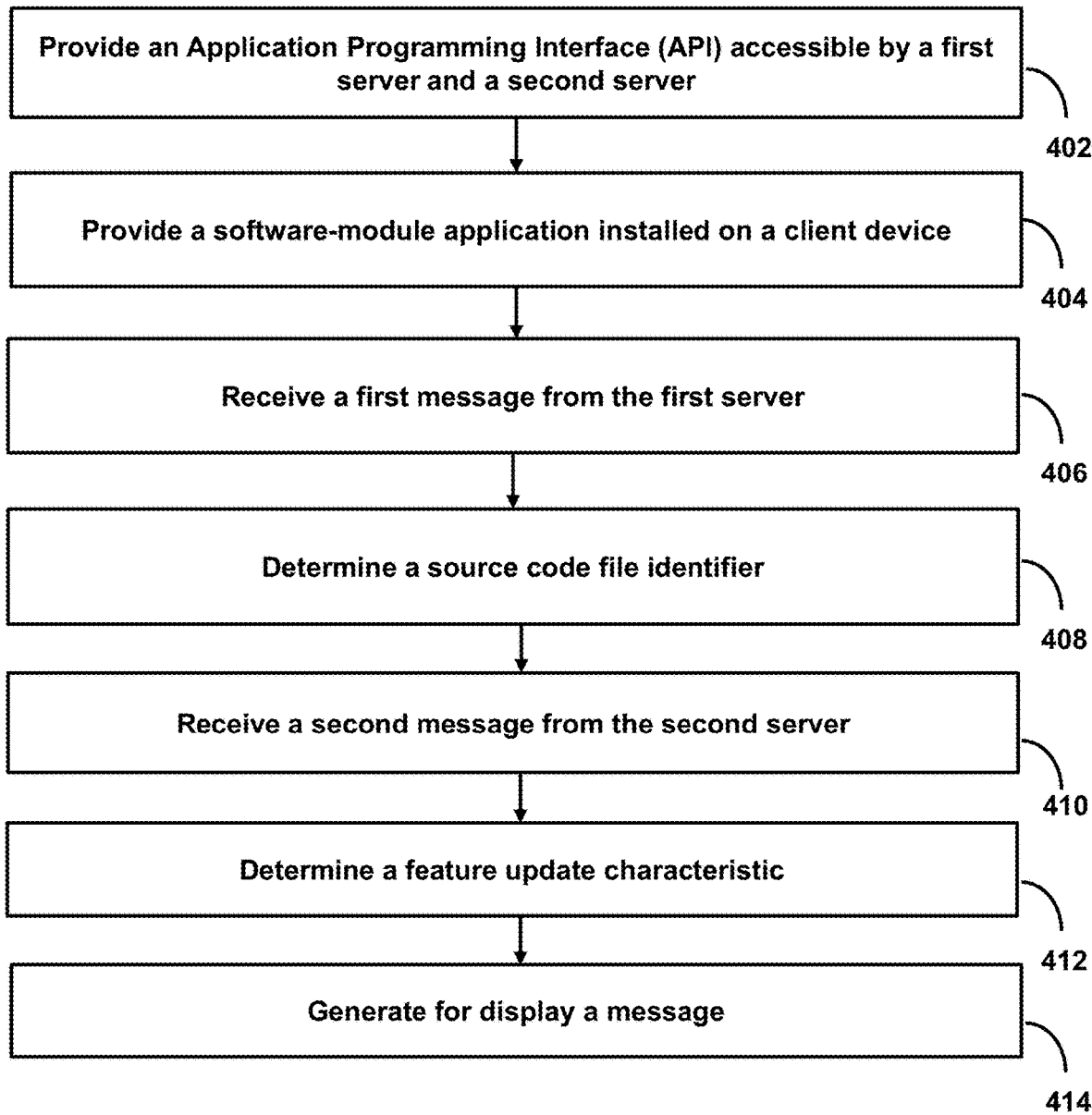
FIG. 4 shows a flowchart of the steps involved in integrating remotely retrieved information from disparate remote computer networks, in accordance with one or more embodiments.

FIG. 4 shows a flowchart of the steps involved in integrating remotely retrieved information from disparate remote computer networks, in accordance with one or more embodiments. For example, the system may use process 400 (e.g., as implemented on one or more system components described above) in order to provide interactive software-development links via user interfaces, based on remotely retrieved information from remote computer networks without requiring users to transition between websites in the user interfaces.

At step 402, process 400 (e.g., using one or more components described above) may provide an API accessible by a first server and a second server. For example, the system may provide an API that is accessible by a first server and a second server that is configured to receive one or more commands from the first server and the second server. The API may enable a software application installed on a client device to exchange data with the first server and the second server in a synchronous request-response pattern. For example, a software developer may install an application on their user device to monitor a software application's development. The application may be a software application configured to interact with one or more remote computing systems over a network such as the Internet. The software application may include an API that enables the software application to communicate with the remote computing systems, such as web servers that are separate from one another. The web servers may provide software-development-related information pertaining to the software application the software developer is developing. To access the software-development-related information, the software developer may use the software application (e.g., a web browser) to obtain the software-development-related information from the remote web servers to receive information regarding one or more stages or statuses of the software application in an all-inclusive user interface. The API may exchange data over the synchronous request-response pattern to enable the user to request data and subsequently receive data back to monitor the development of the software application. For example, the first server may be configured as a software-version controlled repository and the second server may be configured as a software-development automation service platform. The software-version controlled repository may store source code files related to the software application and the software-development automation service platform may use a workflow pipeline to monitor current stages, builds, and statuses of the software application. By doing so, the system may communicate with one or more disparate servers to obtain respective software-development-related information from each respective server, thereby reducing the amount of network traffic conventionally associated with visiting websites associated with each server separately to obtain the software-development-related information.

At step 404, process 400 (e.g., using one or more components described above) may provide a software-module application installed on a client device. For example, the system may provide a software-module application installed on a client device via the software application that comprises a monitoring-function to monitor requests from the first server and the second server. The monitoring-function may exchange data via a synchronous request-response pattern. For example, a software developer interacting with multiple software-development-platforms may use an application installed on their user device to view one or more results, messages, or updates associated with the respective software-development platforms. As described above, the application may be a web browser to enable the software developer to interact with the multiple software-development platforms. To provide an improved user interface via interactive software-development links, process 400 may provide a software-module application installed on the user's mobile device that is associated with the software application that includes a monitoring-function. For example, the software-module application may be a web browser plug-in where the software application is a web browser. As another example, the software-module application may be a software application that is separate from the "main" software application (e.g., the web browser) and may perform one or more functions independently (e.g., interact directly with the user's mobile device to provide one or more messages or other software-development links without the web browser).

The monitoring-function may be configured to monitor requests, events, or other messages transmitted and received from the software-development platforms (e.g., the servers associated with the software-development platforms). For instance, the monitoring-function may be an HTTP callback function that monitors HTTP commands from servers associated with the software-development platforms. As an example, the HTTP callback function may be a synchronous callback function that is passed as a parameter to another function (e.g., of a web server associated with a software-development platform), where the HTTP callback function is "called" when an event occurs at the other function (e.g., when an event occurs, such as an update, at the web server associated with a software-development platform). Such HTTP callback function may exchange data with web servers (e.g., associated with software-development platforms) in the synchronous request-response pattern to ensure that when an event occurs at the web server, the HTTP callback function (or other monitoring-function) may receive such event data before responding to the event.

For example, while developing a software application, the software developer may utilize one or more services provided by the software-development platforms. However, to reduce the negative effects associated with context switching, the monitoring-function may monitor for updates transmitted by the software-development platforms to prevent the software developer from transitioning between one or more user interfaces that are associated with the software-development platforms. For example, the monitoring-function may monitor for updates (or other messages) transmitted by the software-development platforms to generate an interactive software-development link that is related to an update from a respective software-development platform. By doing so, the system may reduce the amount of network traffic as the user (e.g., the software developer) need not interact with each different user interface associated with respective software platforms by refreshing a webpage to obtain new updates related to the software application.

At step 406, process 400 (e.g., using one or more components described above) may receive a first message from the first server. For example, the system may receive, via the monitoring-function, a first message from the first server, where the first message indicates an update to a source code file stored in a software-version controlled repository. For instance, where the software developer is using multiple different software-development platforms (or other software-development-related tools), one of which may be a software-version controlled repository used for storing source code files of the software application the software developer is developing. As software developers often work in teams, one developer may alter a source code file and another developer may be unaware of such an update without transitioning away from a given task, refreshing a user interface of a webpage associated with the software-version controlled repository, and waiting to see whether a file has been altered. As such, network traffic increases for a mundane checkup on the code by waiting for user interface elements associated with the webpage of the software-version controlled repository to refresh, thereby deteriorating the user experience. However, the monitoring-function (e.g., the HTTP callback function) may be triggered when an event at the web server associated with the software-version controlled repository occurs, and such triggering may cause a message from the web server (e.g., that is associated with the software-version controlled repository) to be received, via the monitoring-function, indicating that a source code file has been updated. For example, the HTTP callback function may receive an HTTP command from the server associated with the software-version controlled repository indicating an update to a given source code file stored in the software-version controlled repository. Continuing with the example above, where another software developer on a team of developers updates a source code file, the monitoring-function may receive a message indicating an update to a source code file. In this way, the system may provide updated information based on when an event occurs at a remote computing network, thereby reducing the amount of network traffic caused by a user continually refreshing a webpage to check for updates that may or may not occur.

At step 408, process 400 (e.g., using one or more components described above) may determine a source code file identifier. For example, the system may determine from the first message, a source code file identifier identifying the source code file (e.g., the source code file that was updated). For instance, the message received by the monitoring-function may include information such as an indication that a source code file was updated, an identifier associated with the source code file, or other source code file-related information. The system parses the message (or HTTP command associated with the update to the source code file) to determine a source code file identifier, such as a name of a source code file, a label associated with the source code file, or other identifying information of the source code file. In some embodiments, the system may store the source code file identifier (e.g., in one or more remote databases, in a local memory of the software application, etc.) to generate a message on a user interface associated with the software-module application to notify the user that a respective source code file of a software application the software developer is developing has been updated. By doing so, the system may provide up-to-date information to the user, thereby improving the user experience.

In some embodiments, the system may determine an update to a source code file based on one or more data elements associated with the source code file. For example, the system may determine, based on the source code file identifier, an address of the source code file that is associated with the source code file identifier. For example, the source code file (e.g., that was updated) may be stored in a software-version controlled library. The system may parse through one or more directories associated with the source code file to determine a location, such as an address, of the source code file. For example, the address may be a Uniform Resource Locator (URL) indicating where the source code file is stored or accessible.

The parsing may include determining a match between the source code file identifier to another source code file identifier stored in one or more directories of the software-version controlled repository. Upon determining a match, the system may extract from the webpage, the address associated with the location of the source code file. The system may then extract, based on the location of the source code file, one or more data elements associated with the location of the source code file. For example, the system may access the location of the source code file (e.g., a webpage including (i) the source code file that was updated and (ii) the directory at which the source code file is stored) and may extract one or more HTML elements associated with the location of the source code file. Where the location is accessible via a webpage associated with the software-version controlled repository, the system may parse the webpage, or alternatively, metadata associated with the webpage, to determine whether an indication of an update (e.g., to the source code file) exists.

As an example, when a source code file is updated, the webpage associated with the updated source code file may provide update information indicating that the source code file was updated. Such update information may include a time/date of the update, a line of code that was updated, an identifier identifying the line of code that was updated, or other indication that the source code file has been updated (e.g., a notification, a message, text, or an image). The system may parse through the update information to determine whether the source code file has been updated. For example, the system may compare the update information to a set of predetermined update criteria to determine a match between the update information of the webpage, and at least one predetermined update criterion of the set of predetermined update criteria (e.g., a current date/time, text, an image, etc.). Upon determining that the update information satisfies the predetermined update criteria, the system may determine that the source code file has been updated. As an example, where the update information is a time stamp, the system may determine whether the time stamp is within a threshold time criterion (e.g., within 1 second, 2 seconds, 3 seconds, 1 minute, 2 minutes, 3 minutes, etc.) of the predetermined update criteria. If the timestamp is within the threshold time criterion, the system may determine that the predetermined update criteria are satisfied (e.g., indicating that the source code file has been updated).

In some embodiments, the system may extract text associated with the indication of the update. For example, the system may extract, based on the indication of the update to at least one of the one or more data elements, text associated with the indication of the update. For example, based on determining that the source code file has been updated, the system may extract from the one or more data elements, text indicating the update to the source code file. The text indicating the update to the source code file may be extracted based on Natural Language Processing (NLP) of the one or more data elements. For instance, where the one or more data elements are metadata, the system may perform NLP on the metadata elements to determine whether contextual information exists indicating that the source code file has been updated. As another example, where the one or more data elements are webpage-related code, the system may parse through the webpage-related code to determine whether a line of code indicates that the source code file has been updated.

For instance, as the software-version controlled repository may generate a notification to be displayed on a webpage associated with the location of the source code file (e.g., such that a user may access the location), the notification may be embedded into webpage-related code of the webpage (e.g., HTML code elements, CCS code elements, Java code elements, JavaScript code elements, etc.). The system may parse through the webpage-related code and extract text associated with the indication that the source code file has been updated. For example, where the notification generated by the software-version controlled repository platform indicates "README.c updated Jan. 29, 2022," a data element of the webpage may indicate "<hub-formatted-string force-default-style class=" style-scope ytd-see-metadata ">README.c updated Jan. 29, 2022</hub-formatted-string>==$0." The system may extract from the data element, text associated with the indication of the update (e.g., the notification generated by the software-version controlled repository platform) by extracting the text from the data element of the webpage. As such, the system may extract "README.c updated Jan. 29, 2022." As another example, where the notification generated by the software-version controlled repository platform indicates "return var; updated," a data element of the webpage may indicate "<hub-formatted-string force-default-style class=" style-scope ytd-see-metadata ">return var; </hub-formatted-string>==$0." As such, the system may extract the text "return var;". In some embodiments, as will be discussed later, the system may generate for display, from the software-module application, a message comprising an address of the source code file and the text associated with the indication of the update. By doing so, the system may obtain information to generate a message to a user within a user interface related to the software-module application to prevent a user (e.g., software developer) from transitioning between multiple user interfaces, thereby improving the user experience. Additionally, by doing so, the system may reduce the amount of computer processing resources conventionally required to obtain update-related information as parsing through webpage-related code (e.g., as opposed to graphical webpage elements) uses simple string parsing as opposed to processing graphical webpage elements of a website.

In some embodiments, the system may determine a value associated with a location of the first data element. For example, the system may determine a value, by providing the text associated with the indication of the update to a first function, where the value is updated in response to determining a match between (i) a first data element associated with the location of the source code file and (ii) the text associated with the indication of the update. Where the software-version controlled repository provides an indication that a line of code has been updated, it is advantageous to determine the location of where the line of code is updated. For instance, the indication that a line of code has been updated may not include identifying information identifying which line number has been updated.

As such, the system may use a sequence-alignment function configured to determine a match between each character of a set of characters associated with the text (e.g., the indication of the update) that updates a counter variable to determine which line of code has been updated. For example, the sequence-alignment function may parse through each data element associated with the webpage of the software-version controlled repository platform (e.g., that indicates the update to a source code file) to determine a match between an HTML element associated with the location of the source code file and the text associated with the indication of the update. In response to a failure of a match (e.g., an HTML element does not include matching text of the text associated with the indication of the update), a counter variable may be incremented (e.g., identifying a line of code). In some embodiments, the sequence-alignment function may be a searching function, such as a find function, array find function, character find function, or other searching function.

Continuing with the example above, where the notification generated by the software-version controlled repository platform indicates "return var; updated," a data element of the webpage may include: "<hub-formatted-string force-default-style class=" style-scope ytd-sec-metadata ">var=0; </hub-formatted-string>==$0," "<hub-formatted-string force-default-style class=" style-scope ytd-see-metadata ">var+=1; </hub-formatted-string>==$0," and "<hub-formatted-string force-default-style class=" style-scope ytd-see-metadata ">return var; </hub-formatted-string>==$0." The sequence-alignment function may be provided with the text associated with the indication of the update (e.g., "return var;") and may parse through the data elements of the webpage to determine a match between "return var;" and text of the HTML data elements in sequential order (e.g., the order in which the HTML data elements appear). In this example, there are two HTML data elements that do not include text associated with the indication of the update. The sequence-alignment function may increment the counter variable during parsing until there is a match. As such, when the sequence-alignment function reaches "<hub-formatted-string force-default-style class=" style-scope ytd-sec-metadata ">return var; </hub-formatted-string>==$0." the counter variable may have a value of 3, indicating the line of code that has been updated. In some embodiments, as will be discussed later, the system may generate for display, from the software-module application, a message further comprising the value (e.g., the line of code that was updated). In this way, the system may identify which line of code of a source code file has been updated via a webpage associated with the location of the source code file when line identifying information (or other location information indicating the location of a portion of a source code file) is not present.

At step 410, process 400 (e.g., using one or more components described above) receives a second message from a second server. For example, the system may receive, via the monitoring-function, a second message from the second server, where the second message indicates an update associated with a software-development automation service platform. For example, in addition to the software developer using a software-version controlled repository platform when developing a software application, the software developer may also use a software-development automation service platform. The software-development automation service platform may be a workflow service that automates tasks with respect to developing software applications (e.g., Jenkins, CloudBees, Azure DevOps Server, or other Continuous Integration/Continuous Deployment services/platforms). Such software-development automation service platforms may provide users a workflow (e.g., a pipeline) indicating a lifecycle of software applications that enable software developers to continually build, test, and push software application updates to other users quickly and efficiently when software-development teams are large and robust. Such software-development automation service platforms may automatically release software developer changes to the other users (e.g., clients, end-users) to provide the other users with the most up-to-date software applications.

The software-development automation service platforms that software developers use may provide notifications related to the status of a software application the developer is developing. For example, the notifications (e.g., messages) may relate to build statuses (e.g., updates to sub-applications of a software application), whether a build requires approval (e.g., approval to be released to end-users, approval to advance within a pipeline), successes or failures of a build, whether a build is in testing (e.g., in progress), or other notifications related to the software application or sub-applications of the software application. As discussed above, the software-development automation service platform may be associated with a web server that may exchange messages (e.g., update information, HTTP commands) to the monitoring-function (e.g., HTTP callback function). The messages may indicate automation pipeline features of a set of automation pipeline features of the software-development automation service platform. As an example, the monitoring-function may receive a build update from the software-development automation service platform, indicating that a build has failed. As another example, the monitoring-function may receive a build update from the software-development automation service platform, indicating that a build is successful. As yet another example, the monitoring-function may receive a status update indicating that a build or other task related to the software development of an application needs review, needs to be completed, is complete, is ready for distribution, or other status updates. By receiving messages from the software-development automation service platform via the monitoring-function, the system may monitor for real-time (or near-real-time) updates provided by the software-development automation service platform, thereby improving the user experience as the user need not periodically check build statuses at a separate user interface, and reducing the amount of network traffic.

At step 412, process 400 (e.g., using one or more components described above) may determine a feature update characteristic. For example, the system may determine, from the second message, a feature update characteristic, where the feature update characteristic indicates a characteristic associated with the update. The feature update characteristic may indicate a type of update associated with the automation pipeline feature, information related to the update, or other information characterizing the update as received via the monitoring-function. For example, the message may indicate a build identifier (e.g., a title, name, or other identifying information of the build), a status of the build (e.g., in progress, failed, success), a timestamp (e.g., a date/time of the build, a date/time of execution of a build, a date/time related to the build), or other information. The system may extract such information from the message and determine a feature update characteristic from the extracted information. For example, the feature update characteristic may be a shortened description of the information included in the message that characterizes the type of update (e.g., as received from the pipeline automation service platform). For instance, the feature update characteristic may indicate an update to a build, a status of a build, a build identifier, resources/requirements needed for completing a build, a stage of a build, or other pipeline build/task-related information. The system may use the determined feature update characteristic to generate a new message within a user interface of the software-module application. By doing so, the system may aggregate information from separate software-development-related platforms to generate a message to the user without requiring the user to transition between multiple user interfaces.

In some embodiments, a prediction may be generated. For example, the system may determine, based on the feature update characteristic, whether the feature update characteristic indicates an error associated with the update to the source code file. For instance, the feature update characteristic may indicate information characterizing the update from the software-development automation service platform such as the build status of a build. Where the build status indicates a failure (e.g., that a given build has failed), it is advantageous to determine whether the failure is related to the update to the source code file (e.g., that the monitoring-function retrieved via the software-version controlled automation service platform). For example, to integrate data from disparate remote software-development platforms, the system may use information retrieved from such platforms and determine whether update information from each is related to the other. In some embodiments, the system may use such determination to generate a message to the user (e.g., via a user interface associated with the software-module application) to prevent the user from switching between different user interfaces associated with the differing software-development platforms. Thus, the system may first determine whether the feature update characteristic indicates an error associated with (or is otherwise related to) update to the source code file.

For example, the system may perform NLP on the feature update characteristic to determine whether textual information of the feature update characteristic indicates an error (e.g., a build failure, a build error, an incomplete build, or other contextual information indicating an issue). In some embodiments, the feature update characteristic may identify a source code file identifier that was updated that may be causing the error, and thus, the system may determine that the feature update characteristic indicates an error associated with the update to the source code file. In some embodiments, in response to the feature update characteristic indicating an error, the system may then compare timestamp information of the feature update characteristic to a timestamp at which the indication of the update of the source code file was received. If the timestamp information of the feature update characteristic is within a threshold time of the timestamp of the indication of the update that the source code file was received, the system may determine that the feature update characteristic indicates an error associated with the update to the source code file. By doing so, the system may verify whether the feature update characteristic indicates an error associated with the update to the source code file based on when update-related information was received by the monitoring-function.

Upon determining that the feature update characteristic indicates the error (e.g., associated with the update to the source code file), the system may provide the feature update characteristic and the indication of the update of the source code file to a machine learning model to generate a prediction. For example, the prediction may indicate a resolution to the error. The resolution to the error may be textual information, graphical information, or other information that enables a user to solve a given error. For example, the resolution to the error may indicate a missing variable name, a missing library, a missing semicolon (or other syntax-related information), a need to provide certain permissions to a source code file (e.g., define a new class, associate one file with another file, etc.), or other resolution-related information to resolve one or more errors of one or more source code files and/or feature update characteristics. For instance, the machine learning model may be trained on historical feature update characteristics, historical indication of updates to source code files (e.g., lines of code causing an error, lines of code that were updated, or other code-related information) and historical solutions to such errors. The machine learning model may learn relationships between the training data to predict a potential "fix" or other resolution to the error, thereby improving the user experience as the user may be presented with a potential cure to the error at hand.

In some embodiments, an address may be determined that is associated with the resolution to the error. For example, the system may determine an address associated with the resolution to the error based on a database including a set of historically resolved errors. For instance, the system may be associated with a database (e.g., to which the machine learning model is trained on) storing historically resolved errors. Each historically resolved error may be associated with a given historical feature update characteristic of a set of historical feature update characteristics and a historical error. That is, each historically resolved error may be mapped to a feature update characteristic associated with a historical error (e.g., as obtained from the remote software-development platforms). For example, a historically resolved error may be associated with a given feature update characteristic that indicates a given error. Additionally, each historically resolved error may be a predetermined solution to a given error that may indicate a conversation between software developers that resolved the error, a paragraph of information on how to resolve the error, or code portions, code libraries, or other code-related information associated with resolving the error. The system may parse through the database using the predicted resolution to the error to determine an address associated with the resolution to the error. For example, the address may be a link, hyperlink, directory location, or other address to where the resolution to the error may be found. To provide an interactive link to a software developer that indicates a fix, cure, or other resolution to the error at hand, the system may determine where such resolution to the error is located. For example, the system may identify a match between the predicted resolution to the error and a historical resolution to the error (e.g., as stored in the database). In response to determining the match, the system may determine an address associated with the location. For example, the system may obtain a directory location (e.g., a URL, a file path, a directory path, etc.) associated with the location of where the historical resolution to the error is stored. The system may then extract the address to generate a message (e.g., an interactive link) to the user via a user interface associated with the software-module application to enable the user to fix the current error (or be brought to the location of the resolution to the error), thereby improving the user experience while also reducing the amount of network traffic otherwise wasted on the user researching the potential cure to the error.

In some embodiments, the system may extract text associated with a data element that corresponds to an error. For example, to enable a software developer to quickly and readily identify a line of code that may be causing an error of the source code file that has been updated, it may be advantageous to provide the line of code in a message of a user interface of the software-module application. For example, the system may determine, based on the feature update characteristic, whether the feature update characteristic indicates an error associated with the update to the source code file. In response to the feature update characteristic indicating the error, the system may determine, based on the source code file identifier, an address associated with the source code file identifier, where the address indicates a location associated with an entity within the software-version controlled repository. For example, the entity may be a company, merchant, service provider, or other organization.

The software-version controlled repository may store source code files in association with an entity. For instance, an entity may create an account via the software-version controlled repository. As such, the system may extract based on the location associated with the entity (e.g., a source code storage directory associated with the entity in software-version controlled repository, a URL associated with the software-version controlled library, etc.), one or more data elements associated with the location of the source code file. For example, as discussed above, the one or more data elements may be webpage elements of a webpage associated with the location of where the source code file is stored within the software-version controlled repository. The system may then perform NLP on the one or more data elements to determine whether at least one of the one or more data elements correspond to the error. As an example, the NLP may provide contextual information regarding the source code file and which lines of code of the source code file may have been updated. For instance, where the feature update characteristic indicates that a build failed because a given source code file was updated, the system may perform NLP of the data elements of the webpage to determine which line of code of the source code file was updated and the associated text (e.g., the updated portion of the source code file). For example, the system may determine a match between text associated with the error (e.g., as indicated by the feature update characteristic) and text of a data element (e.g., of the webpage associated with the location of the location of the source code file). In response to at least one of the one or more data elements corresponding to the error, the system may extract the text of the data elements corresponding to the error. For example, the system may extract the text of the source code file that was updated (e.g., a line of code that was updated, a phrase of code that was updated, or multiple lines of code that were updated). By doing so, the system may provide detailed information of the error associated with the feature update characteristic to be displayed on a user interface associated with the software-module application, thereby improving the user experience.

At step 414, process 400 (e.g., using one or more components described above) generates for display, a message. For example, the system may generate for display, from the software-module application, a message comprising the source code file identifier and the feature update characteristic, where the source code file identifier includes a link to an address associated with the source code file. In some embodiments, as discussed above, the system may generate a message that further includes the address of the source code file, the text associated with the indication of the update, a value associated with where a data element is located, an address associated with a resolution to an error, and/or text associated with one or more data elements corresponding to the error. As discussed above, to reduce the negative effects of context switching, it is advantageous to provide a single user interface to the user (e.g., software developer) that enables the software developer to monitor software-development-related information from disintegrated remote computing platforms (e.g., remote software-development-related service platforms). Not only may generating such a message in a single user interface to the user reduce the negative effect of context switching but, by doing so, also provides a reduction of network traffic, computer processing, and memory resources utilized, as users are conventionally forced to continually update webpages associated with each disparate remote computing network to obtain updated information, thereby improving the user experience.

Figure 5:
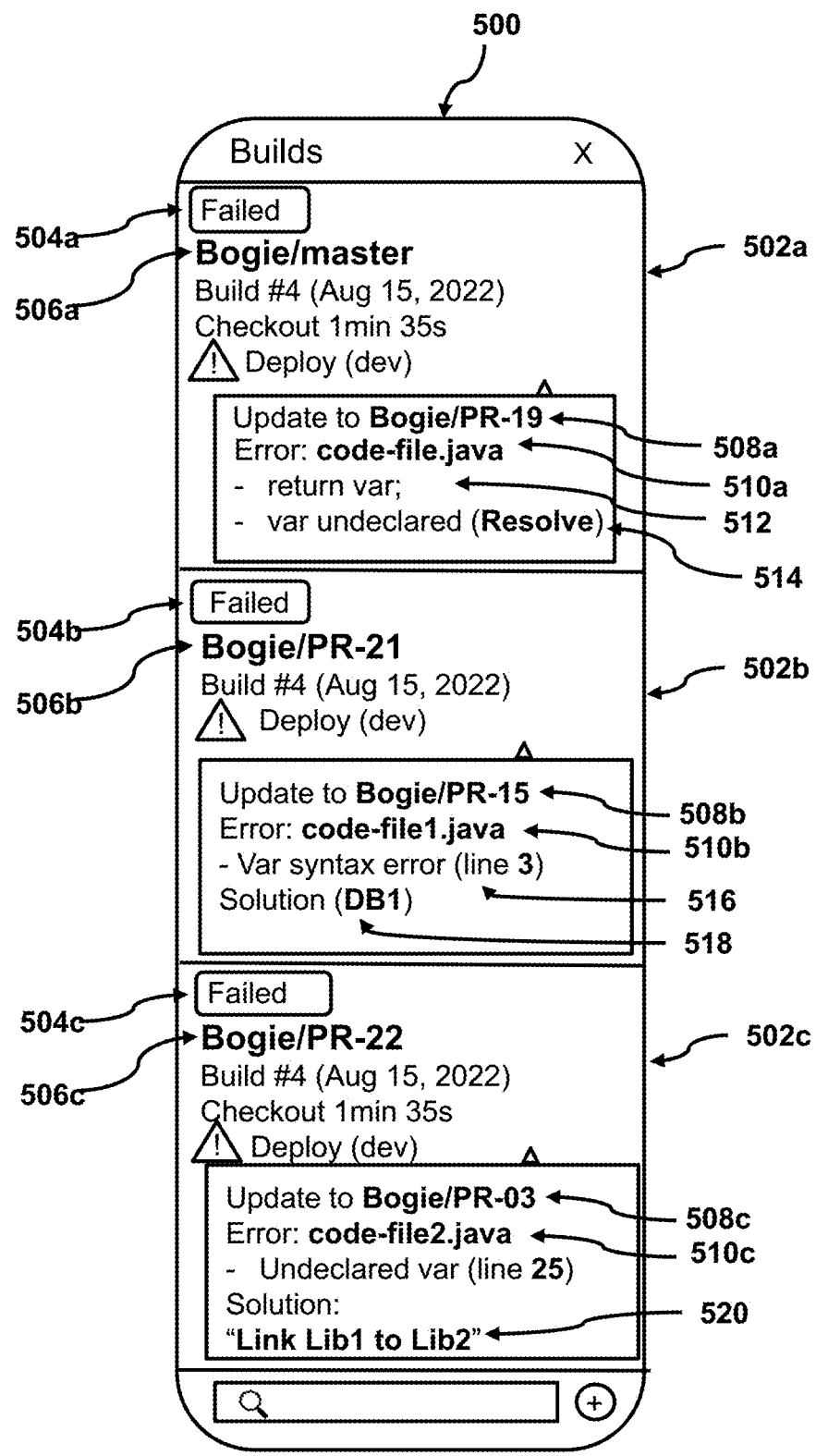
FIG. 5 shows an illustrative example of a user interface comprising messages, in accordance with one or more embodiments.

As an example, referring to FIG. 5, FIG. 5 shows illustrative examples of a user interface comprising messages, in accordance with one or more embodiments. For example, FIG. 5 shows a user interface 500 associated with a software application that is generated via the software-module application providing messages to a user indicating aggregated information from the one or more servers (e.g., the software-development automation service platform, software-version controlled repository, etc.). User interface 500 may include one or more messages 502a-504c. Each message 502a-504c may include a status identifier 504 (e.g., indicating a status of a build), aspect identifier 506 (e.g., indicating a build identifier), feature update characteristic 508 (e.g., indicating a characterization of an update from a software-development automation service platform), and source code file identifier 510 (e.g., indicating a source code file that was updated, needs to be updated, an interactive link to the source code file that was updated or is associated with an error, etc.). It should be noted, that in some embodiments, user interface 500 may correspond to interactive user interface 100 (FIG. 1) and may include or exclude one or more features of interactive user interface 100, in accordance with some embodiments.

In some embodiments, first message 502a may include text associated with an indication of the update 512. For example, as discussed above, the text associated with the indication of the update 512 may be extracted from a data element of webpage-related code indicating source code that was updated with respect to a source code file. First message 502 may also include an address associated with a resolution to an error 514. For example, the address associated with the resolution to the error 514 may include an interactive link (e.g., a hyperlink, directory location, etc.) of how to resolve a given error. As another example, the address associated with the resolution to the error 514 may include additional information indicating the error itself (e.g., var undeclared).

In some embodiments, second message 502b may include a value associated with a location of a data element 516. For example, the value associated with the location of a data element 516 may indicate an identifier identifying a line of code that has been updated that is associated with an error (e.g., var syntax error located at line 3 of source code file "code-file1.java"). Second message 502b may additionally include an address associated with the resolution to the error 518. For example, the address associated with the resolution to the error 518 may include an interactive link (e.g., to a database directory) to enable a user (e.g., software developer) to view how to fix the error. In some embodiments, third message 502c may include solution preview 520. For example, solution preview 520 may indicate a resolution to an error generated for display in the user interface 500. For instance, the solution preview may be a shortened version, a paraphrase, or the entire resolution to the error (e.g., historical resolution to the error) to enable the user (e.g., software developer) to be notified of how to fix a given error. In some embodiments, solution preview 520 may include an interactive link to a corresponding historical resolution to the error (e.g., as stored in a local database, a remote database, etc.) to provide additional details on how to resolve a given error.

In some embodiments, the system may obtain a resolution to an error via a third server. For example, the API may be further accessible by a third server and may be configured to receive one or more other commands (e.g., messages) from the third server, via exchanging data with the third server in the synchronous request-response pattern. For example, the third server may be associated with another software-development-related platform. As an example, an instant messaging service used amongst the software developers may be associated with a web server. The software-module application installed on the client device (e.g., a user device) via the software application may further include a second monitoring-function to monitor requests from the third server (e.g., the instant messaging service), where the second monitoring-function exchanges data via the synchronous request-response pattern. For example, the software-module application may monitor messages being passed between software developers. The monitoring-function may monitor for messages that are related to potential errors to enable the software developer to be presented with real-time or near-real-time updates of resolutions to errors that the developer may be currently experiencing. For example, as errors associated with a software application may be newly discovered, it may be advantageous to monitor the conversations of the software developers working on a potential solution to the error. As such, the system may receive, via the second monitoring-function, a message from the third server, where the message indicates information related to the software-development automation service platform. For example, the message may indicate a conversational dialogue related to a build status of the software-development automation service platform.

The system may then determine based on the conversational dialogue, whether the dialogue includes a resolution to an error associated with the feature update characteristic. For instance, as the software developers converse with one another via the instant messenger, upon detecting that a reference to a feature update characteristic appears in the conversation, the system may perform NLP on the conversation to determine whether the dialogue indicates a resolution to the error. For example, the software developers may discuss a resolution to the error and the system may extract such information (e.g., the resolution to the error). The system may then generate a message (e.g., via the software-module application) including the resolution to the error based on the conversation held in the instant messaging service. In this way, the system may provide real-time (or near-real-time) resolutions to errors to the user for newly discovered errors, thereby improving the user experience and integrating update-related information from disparate remote computing networks.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The Present Techniques Will be Better Understood with Reference to the Following Enumerated Embodiments:

1. A method, the method comprising: providing an Application Programming Interface (API) that is accessible by a first server and a second server that is configured to receive one or more commands from the first server and the second server, wherein the API allows a software application installed on a client device to exchange data with the first server and the second server in a synchronous request-response pattern; providing a software-module application installed on the client device via the software application that comprises a monitoring-function to monitor requests from the first server and the second server, wherein the monitoring-function exchanges data via the synchronous request-response pattern; receiving, via the monitoring-function, a first message from the first server, wherein the first message indicates an update to a source code file stored in a software-version controlled repository; determining, from the first message, a source code file identifier identifying the source code file; receiving, via the monitoring-function, a second message from the second server, wherein the second message indicates an update associated with a software-development automation service platform; determining, from the second message, a feature update characteristic, wherein the feature update characteristic indicates a characteristic associated with the update; and generating, for display, from the software-module application, a message comprising the source code file identifier and the feature update characteristic, wherein the source code file identifier includes a link to an address associated with the source code file.

2. The method of any one of the preceding embodiments, further comprising: determining, based on the source code file identifier, an address of the source code file that is associated with the source code file identifier, wherein the address indicates a location of the source code file associated with the software-version controlled repository; extracting, based on the location of the source code file, one or more data elements associated with the location of the source code file, wherein the one or more data elements indicates information related to the update to the source code file; and determining, based on the one or more data elements, an indication of an update to at least one of the one or more data elements.

3. The method of any one of the preceding embodiments, further comprising: extracting, based on the indication of the update to at least one of the one or more data elements, text associated with the indication of the update, wherein the text indicates source code that has been updated; and generating, based on the text associated with the indication of the update, the message, wherein the message further comprises (i) the address of the source code file and (ii) the text associated with the indication of the update.

4. The method of any one of the preceding embodiments, further comprising: determining a value, by providing the text associated with the indication of the update to a first function, wherein the value is updated in response to determining a match between (i) a first data element associated with the location of the source code file and (ii) the text associated with the indication of the update; and generating the message, wherein the message further comprises the value, wherein the value is associated with where the first data element is located.

5. The method of any one of the preceding embodiments, further comprising: determining, based on the feature update characteristic, whether the feature update characteristic indicates an error associated with the update to the source code file; and in response to the feature update characteristic indicating the error, providing (i) the feature update characteristic and (ii) the indication of the update of the source code file to a machine learning model to generate a prediction, wherein the prediction indicates a resolution to the error.

6. The method of any one of the preceding embodiments, further comprising: determining an address associated with the resolution to the error, based on a database, the database comprises a set of historically resolved errors, wherein each historically resolved error is associated with (i) a historical feature update characteristic of a set of historical feature update characteristics and (ii) a historical error; and generating the message, wherein the message further comprises the address associated with the resolution to the error.

7. The method of any one of the preceding embodiments, further comprising: determining, based on the feature update characteristic, whether the feature update characteristic indicates an error associated with the update to the source code file; in response to the feature update characteristic indicating the error, determining, based on the source code file identifier, an address associated with the source code file identifier, wherein the address indicates a location associated with an entity within the software-version controlled repository; extracting, based on the location associated with the entity, one or more data elements associated with the location of the source code file; performing natural language processing on the one or more data elements;

determining, based on the natural language processing, whether at least one of the one or more data elements correspond to the error; and in response to at least one of the one or more data elements corresponding to the error, extracting text associated with the at least one of the one or more data elements corresponding to the error.

8. The method of any one of the preceding embodiments, wherein the API is further accessible by a third server and is configured to receive one or more other commands from the third server, wherein the API allows the software application to exchange data with the third server in the synchronous request-response pattern, and wherein the software-module application installed on the client device via the software application further comprises a second monitoring-function to monitor requests from the third server, wherein the second monitoring-function exchanges data via the synchronous request-response pattern; and wherein the method further comprises: receiving, via the second monitoring-function, a third message from the third server, wherein the third message indicates information related to the software-development automation service platform; determining, based on the third message, whether the information related to the software-development automation service platform indicates a resolution to an error associated with the feature update characteristic; and generating the message, wherein the message further comprises the resolution to the error associated with the feature update characteristic.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

What is claimed is:

1. A system for providing interactive software-development links via user interfaces, based on remotely retrieved information from remote computer networks without requiring users to transition between websites in the user interfaces, the system comprising:
    a first server configured as a software-version controlled repository;
    a second server configured as a software-development automation service platform;
    memory hardware storing computer program instructions; and
    one or more processors for executing the computer program instructions that, when executed, cause the one or more processors to perform operations comprising:
        providing an Application Programming Interface (API) that is accessible by the first server and the second server that is configured to receive one or more commands from the first server and the second server, wherein the API allows a software application installed on a client device to exchange data with the first server and the second server in a synchronous request-response pattern;
        providing a software-module application installed on the client device via the software application that comprises an HTTP callback function to monitor HTTP commands from the first server and the second server, wherein the HTTP callback function exchanges data via the synchronous request-response pattern;
        receiving, via the HTTP callback function, a first HTTP command from the first server, wherein the first HTTP command indicates an update to a source code file stored in the software-version controlled repository;
        determining, from the first HTTP command, a source code file identifier identifying the source code file;
        receiving, via the HTTP callback function, a second HTTP command from the second server, wherein the second HTTP command indicates an update associated with an automation pipeline feature of a set of automation pipeline features of the software-development automation service platform;
        determining, from the second HTTP command, a feature update characteristic, wherein the feature update characteristic indicates a type of update associated with the automation pipeline feature; and
        generating, for display, in a user interface associated with the software application, based on the software-module application, a message indicating the source code file identifier and the feature update characteristic, wherein the source code file identifier includes a link to an address associated with the source code file.

2. The system of claim 1, wherein the operations further comprise:
    determining, based on the source code file identifier, an address of the source code file that is associated with the source code file identifier, wherein the address indicates a location of the source code file within a directory of the software-version controlled repository;
    accessing, based on the address of the source code file, the location of the source code file within the directory of the software-version controlled repository;
    extracting, based on the location of the source code file, one or more HTML elements associated with the location of the source code file, wherein the one or more HTML elements indicate information related to the update to the source code file; and
    determining, based on the one or more HTML elements, an indication of an update to at least one of the one or more HTML elements.

3. The system of claim 2, wherein the operations further comprise:
    extracting, based on the indication of the update to at least one of the one or more HTML elements, text associated with the indication of the update, wherein the text indicates source code that has been updated; and
    generating, based on the text associated with the indication of the update, the message, wherein the message further comprises (i) the address of the source code file and (ii) the text associated with the indication of the update.

4. The system of claim 3, wherein the operations further comprise:
    determining a counter variable value, by providing the text associated with the indication of the update to a sequence-alignment function configured to determine a match between each character of a set of characters associated with the text in sequential order, wherein the counter variable value is updated in response to determining a match between (i) a first HTML element associated with the location of the source code file and (ii) the text associated with the indication of the update; and
    generating the message, wherein the message further comprises the counter variable value, wherein the counter variable value indicates a number associated with a location of the first HTML element.

5. A method for providing interactive software-development links via user interfaces, based on remotely retrieved information from remote computer networks without requiring users to transition between websites in the user interfaces, the method comprising:
providing an Application Programming Interface (API) that is accessible by a first server and a second server that is configured to receive one or more commands from the first server and the second server, wherein the API allows a software application installed on a client device to exchange data with the first server and the second server in a synchronous request-response pattern;
providing a software-module application installed on the client device via the software application that comprises a monitoring-function to monitor requests from the first server and the second server, wherein the monitoring-function exchanges data via the synchronous request-response pattern;
receiving, via the monitoring-function, a first message from the first server, wherein the first message indicates an update to a source code file stored in a software-version controlled repository;
determining, from the first message, a source code file identifier identifying the source code file;
receiving, via the monitoring-function, a second message from the second server, wherein the second message indicates an update associated with a software-development automation service platform;
determining, from the second message, a feature update characteristic, wherein the feature update characteristic indicates a characteristic associated with the update; and
generating, for display, from the software-module application, a message comprising the source code file identifier and the feature update characteristic, wherein the source code file identifier includes a link to an address associated with the source code file.

6. The method of claim 5, further comprising:
determining, based on the source code file identifier, an address of the source code file that is associated with the source code file identifier, wherein the address indicates a location of the source code file associated with the software-version controlled repository;
extracting, based on the location of the source code file, one or more data elements associated with the location of the source code file, wherein the one or more data elements indicate information related to the update to the source code file; and
determining, based on the one or more data elements, an indication of an update to at least one of the one or more data elements.

7. The method of claim 6, further comprising:
extracting, based on the indication of the update to at least one of the one or more data elements, text associated with the indication of the update, wherein the text indicates source code that has been updated; and
generating, based on the text associated with the indication of the update, the message, wherein the message further comprises (i) the address of the source code file and (ii) the text associated with the indication of the update.

8. The method of claim 7, further comprising:
determining a value, by providing the text associated with the indication of the update to a first function, wherein the value is updated in response to determining a match between (i) a first data element associated with the location of the source code file and (ii) the text associated with the indication of the update; and
generating the message, wherein the message further comprises the value, wherein the value is associated with a location of the first data element.

9. The method of claim 5, further comprising:
determining, based on the feature update characteristic, whether the feature update characteristic indicates an error associated with the update to the source code file; and
in response to the feature update characteristic indicating the error, providing (i) the feature update characteristic and (ii) the indication of the update of the source code file to a machine learning model to generate a prediction, wherein the prediction indicates a resolution to the error.

10. The method of claim 9, further comprising:
determining an address associated with the resolution to the error, based on a database, the database comprises a set of historically resolved errors, wherein each historically resolved error is associated with (i) a historical feature update characteristic of a set of historical feature update characteristics and (ii) a historical error; and
generating the message, wherein the message further comprises the address associated with the resolution to the error.

11. The method of claim 5, further comprising:
determining, based on the feature update characteristic, whether the feature update characteristic indicates an error associated with the update to the source code file;
in response to the feature update characteristic indicating the error, determining, based on the source code file identifier, an address associated with the source code file identifier, wherein the address indicates a location associated with an entity within the software-version controlled repository;
extracting, based on the location associated with the entity, one or more data elements associated with the location of the source code file;
performing natural language processing on the one or more data elements;
determining, based on the natural language processing, whether at least one of the one or more data elements correspond to the error; and
in response to at least one of the one or more data elements corresponding to the error, extracting text associated with the at least one of the one or more data elements corresponding to the error.

12. The method of claim 5, wherein the API is further accessible by a third server and is configured to receive one or more other commands from the third server, wherein the API allows the software application to exchange data with the third server in the synchronous request-response pattern, and wherein the software-module application installed on the client device via the software application further comprises a second monitoring-function to monitor requests from the third server, wherein the second monitoring-function exchanges data via the synchronous request-response pattern; and wherein the method further comprises:
receiving, via the second monitoring-function, a third message from the third server, wherein the third message indicates information related to the software-development automation service platform;

determining, based on the third message, whether the information related to the software-development automation service platform indicates a resolution to an error associated with the feature update characteristic; and generating the message, wherein the message further comprises the resolution to the error associated with the feature update characteristic.

13. A non-transitory, computer-readable medium comprising instructions that, when executed by one or more processors, cause operations comprising:

providing an Application Programming Interface (API) that is accessible by a first server and a second server that is configured to receive one or more commands from the first server and the second server, wherein the API allows a software application installed on a client device to exchange data with the first server and the second server in a synchronous request-response pattern;

providing a software-module application installed on the client device via the software application that comprises a monitoring-function to monitor requests from the first server and the second server, wherein the monitoring-function exchanges data via the synchronous request-response pattern;

receiving, via the monitoring-function, a first message from the first server, wherein the first message indicates an update to a source code file stored in a software-version controlled repository;

determining, from the first message, a source code file identifier identifying the source code file;

receiving, via the monitoring-function, a second message from the second server, wherein the second message indicates an update associated with a software-development automation service platform;

determining, from the second message, a feature update characteristic, wherein the feature update characteristic indicates a characteristic associated with the update; and generating, for display, from the software-module application, a message comprising the source code file identifier and the feature update characteristic, wherein the source code file identifier includes a link to an address associated with the source code file.

14. The non-transitory, computer-readable medium of claim 13, wherein the operations further comprise:

determining, based on the source code file identifier, an address of the source code file that is associated with the source code file identifier, wherein the address indicates a location of the source code file associated with the software-version controlled repository;

extracting, based on the location of the source code file, one or more data elements associated with the location of the source code file, wherein the one or more data elements indicate information related to the update to the source code file; and determining, based on the one or more data elements, an indication of an update to at least one of the one or more data elements.

15. The non-transitory, computer-readable medium of claim 14, wherein the operations further comprise:

extracting, based on the indication of the update to at least one of the one or more data elements, text associated with the indication of the update, wherein the text indicates source code that has been updated; and generating, based on the text associated with the indication of the update, the message, wherein the message further comprises (i) the address of the source code file and (ii) the text associated with the indication of the update.

16. The non-transitory, computer-readable medium of claim 15, wherein the operations further comprise:

determining a value, by providing the text associated with the indication of the update to a first function, wherein the value is updated in response to determining a match between (i) a first data element associated with the location of the source code file and (ii) the text associated with the indication of the update; and generating the message, wherein the message further comprises the value, wherein the value is associated with a location of the first data element.

17. The non-transitory, computer-readable medium of claim 13, wherein the operations further comprise:

determining, based on the feature update characteristic, whether the feature update characteristic indicates an error associated with the update to the source code file; and in response to the feature update characteristic indicating the error, providing (i) the feature update characteristic and (ii) the indication of the update of the source code file to a machine learning model to generate a prediction, wherein the prediction indicates a resolution to the error.

18. The non-transitory, computer-readable medium of claim 17, wherein the operations further comprise:

determining an address associated with the resolution to the error, based on a database, the database comprises a set of historically resolved errors, wherein each historically resolved error is associated with (i) a historical feature update characteristic of a set of historical feature update characteristics and (ii) a historical error; and generating the message, wherein the message further comprises the address associated with the resolution to the error.

19. The non-transitory, computer-readable medium of claim 13, wherein the operations further comprise:

determining, based on the feature update characteristic, whether the feature update characteristic indicates an error associated with the update to the source code file;

in response to the feature update characteristic indicating the error, determining, based on source code file identifier, an address associated with the source code file identifier, wherein the address indicates a location associated with an entity within the software-version controlled repository;

extracting, based on the location associated with the entity, one or more data elements associated with the location of the source code file;

performing natural language processing on the one or more data elements;

determining, based on the natural language processing, whether at least one of the one or more data elements correspond to the error; and in response to at least one of the one or more data elements corresponding to the error, extracting text associated with the at least one of the one or more data elements corresponding to the error.

20. The non-transitory, computer-readable medium of claim 13, wherein the API is further accessible by a third server and is configured to receive one or more other commands from the third server, wherein the API allows the software application to exchange data with the third server in the synchronous request-response pattern, and wherein the software-module application installed on the client device via the software application further comprises a second monitoring-function to monitor requests from the third server, wherein the second monitoring-function exchanges data via the synchronous request-response pattern; and wherein the operations further comprise:
  receiving, via the second monitoring-function, a third message from the third server, wherein the third message indicates information related to the software-development automation service platform;
  determining, based on the third message, whether the information related to the software-development automation service platform indicates a resolution to an error associated with the feature update characteristic; and
  generating the message, wherein the message further comprises the resolution to the error associated with the feature update characteristic.

* * * * *